(12) United States Patent
Bini et al.

(10) Patent No.: US 10,883,510 B2
(45) Date of Patent: Jan. 5, 2021

(54) CONTROL METHOD OF A COMPRESSOR MECHANICALLY COUPLED TO A TURBINE

(71) Applicants: Roberto Bini, Brescia (IT); Mario Gaia, Brescia (IT)

(72) Inventors: Roberto Bini, Brescia (IT); Mario Gaia, Brescia (IT)

(73) Assignee: TURBODEN S.P.A., Brescia (IT)

( * ) Notice: Subject to any disclaimer, the term of this patent is extended or adjusted under 35 U.S.C. 154(b) by 80 days.

(21) Appl. No.: 16/316,219

(22) PCT Filed: Jul. 25, 2017

(86) PCT No.: PCT/IB2017/054498
§ 371 (c)(1),
(2) Date: Jan. 8, 2019

(87) PCT Pub. No.: WO2018/020413
PCT Pub. Date: Feb. 1, 2018

(65) Prior Publication Data
US 2019/0309763 A1    Oct. 10, 2019

(30) Foreign Application Priority Data
Jul. 26, 2016    (IT) .................... 102016000077686

(51) Int. Cl.
*F01D 17/00* (2006.01)
*F04D 27/02* (2006.01)
(Continued)

(52) U.S. Cl.
CPC ......... *F04D 27/0261* (2013.01); *F01D 15/08* (2013.01); *F01D 17/165* (2013.01); (Continued)

(58) Field of Classification Search
CPC ........ F01D 15/08; F01D 17/165; F04D 25/04; F04D 27/002; F04D 27/0253;
(Continued)

(56) References Cited

U.S. PATENT DOCUMENTS 5,609,465 A * 3/1997 Batson .................... F01D 17/06
 415/1
6,250,877 B1 * 6/2001 Westphal ................ F01D 17/06
 415/17

(Continued)

*Primary Examiner* — Ninh H. Nguyen
(74) *Attorney, Agent, or Firm* — R. Ruschena Patent Agent, LLC

(57) ABSTRACT

A control method of a centrifugal compressor (C) mechanically coupled to an expansion turbine (TorC), the centrifugal compressor (C) being provided with at least a control system (20) of the absorbed power. The control method of the rotation speed of the turbine-centrifugal compressor group performs the following steps: —acting on the centrifugal compressor control system (20) of the absorbed power by means of a first controller (PID-f), in order to keep constant the rotational speed of the compressor mechanically coupled to the expansion turbine; —ensuring that the centrifugal compressor (C) remains in a stable operating condition by means of an admission valve (Vi) of the expansion turbine (TorC).

8 Claims, 3 Drawing Sheets

(51) Int. Cl.
*F04D 17/18* (2006.01)
*F04D 29/58* (2006.01)
*F04D 25/04* (2006.01)
*F02C 1/00* (2006.01)
*F01D 15/08* (2006.01)
*F04D 29/46* (2006.01)
*F01D 17/16* (2006.01)
*F04D 27/00* (2006.01)
*F01K 25/10* (2006.01)

(52) U.S. Cl.
CPC .............. *F02C 1/007* (2013.01); *F04D 17/18* (2013.01); *F04D 25/04* (2013.01); *F04D 27/002* (2013.01); *F04D 27/0207* (2013.01); *F04D 27/0246* (2013.01); *F04D 27/0253* (2013.01); *F04D 27/0284* (2013.01); *F04D 29/462* (2013.01); *F04D 29/5826* (2013.01); *F01K 25/10* (2013.01); *F05D 2250/90* (2013.01); *F05D 2270/024* (2013.01)

(58) Field of Classification Search
CPC .............. F04D 29/462; F04D 29/5826; F05D 2250/90; F05D 2270/024
See application file for complete search history.

(56) References Cited

U.S. PATENT DOCUMENTS

| | | | |
|---|---|---|---|
| 6,581,384 B1* | 6/2003 | Benson | F01K 25/08 60/653 |
| 7,421,854 B2* | 9/2008 | Shaffer | F04D 27/0246 60/239 |
| 7,594,386 B2* | 9/2009 | Narayanan | F04D 27/0207 415/13 |
| 8,430,938 B1* | 4/2013 | Miller | C01B 3/382 48/197 R |
| 8,844,290 B2* | 9/2014 | Yoshinari | F01D 15/08 60/660 |
| 9,879,688 B2* | 1/2018 | Mirsky | F04D 27/0292 |
| 10,066,499 B2* | 9/2018 | Mariotti | F02C 9/20 |

* cited by examiner

CONTROL METHOD OF A COMPRESSOR MECHANICALLY COUPLED TO A TURBINE

BACKGROUND OF THE INVENTION

1. Field of the Invention

The present invention relates to a control method of a compressor mechanically coupled to a turbine.

The control method is particularly but not exclusively suitable for an industrial compressor mechanically coupled to a turbine powered by an organic working fluid, in other words to a turbine that is part of an organic Rankine cycle system (hereinafter also ORC, from the English acronym Organic Rankine Cycle) and using an organic working fluid. It must be understood that the above-mentioned control method is also applicable to any other machine mechanically coupled to a general expansion turbine using any other working fluid (water vapor, gas and the like).

2. Brief Description of the Prior Art

As is known, a thermodynamic cycle is termed as a finite succession of thermodynamic transformations (such as isotherms, isocores, isobars or adiabatics) at the end of which the system returns to its initial state. In particular, an ideal Rankine cycle is a thermodynamic cycle consisting of two adiabatic and two isobaric transformations, with a phase transformation from liquid to vapor and from vapor to liquid. Its purpose is to transform heat into work. This cycle is generally adopted mainly in power generation plants and uses water as driving fluid, both in a liquid and vaporized state, with the so-called steam turbine.

More specifically, organic Rankine cycles (ORC) have been suggested and used, using high molecular mass organic fluids for the most various applications, in particular also for the exploitation of low-medium enthalpy thermal sources. As in other steam cycles, the ORC cycle system includes one or more pumps for supplying the organic working fluid, one or more heat exchangers for carrying out the preheating, vaporization and possibly overheating phases in supercritical conditions of the same working fluid, a steam turbine for the expansion of the fluid, mechanically connected to an electric generator or a working machine, a condenser that returns the organic fluid to the liquid state and possibly a regenerator for recovering the heat downstream of the turbine and upstream of the condenser.

It is also known that a working machine for industrial applications such as a pump or a rotary compressor, in order to perform its function is typically coupled to an electric motor. In some cases, the industrial site has already a pressurized steam at its disposal, which can be expanded for the production of a mechanical energy by means of a turbine. The steam turbine can be connected to an electric generator: the electric power generated is usually sold to the network operator or is used to compensate for at least a portion of the internal electrical consumptions. In such cases, the electric motor operating the working machine will be able to use the electrical energy produced within the site.

In other cases, however, it may be convenient to connect the turbine directly to the working machine: in such way the overall efficiency of the system increases, as two efficiencies do not intervene, the one of the electric generator (which is coupled to the turbine) and the one of the electric motor (which is coupled to the compressor). Furthermore, in some countries, this allows to the company to save on system costs on energy produced and self-consumed, which must be paid to the network operator: in fact, the company even if it produces exactly the electric power consumed by the engine of the compressor, has in any case to pay the system-related charges for the electricity produced.

The disadvantage of this second mode, with a direct coupling of turbine and compressor, is the loss of flexibility due to the fact that the compressor is directly driven by the turbine and therefore it needs to have an accurate adjustment that guarantees the equivalence between the generated and the consumed power. Conversely, if the compressor or the pump are connected to an electric motor, the rotation speed is normally fixed by the electric frequency of the power distribution network that automatically outputs the variable power required by the compressor. In addition, in general, the reliability of a single electric motor is greater than that of a turbine, which depends on a more complex system made of boiler, heat exchangers, pumps, regulating members.

In the following, either for analyzing the technical background or for describing the related invention which is the subject of this patent application, the case of a centrifugal compressor will be analyzed merely by way of an example. It is evident, however, that the invention can be effortlessly applied to other types of compressors or pumps.

Typically, the industrial compressors are adjusted in order to guarantee a constant pressure to the user when the flow rate is varied.

The most common adjustment methods are:
- a lamination of flow rate, that is a flow regulation by means of a valve placed on the compressor supply; —a lamination at suction, that is a flow regulation by means of a valve placed on the suction side of the compressor;
- a bypass: a portion of the already compressed gas is dissipated into the atmosphere or is recycled towards the suction, upstream of the compressor;
- a change in the number of revolutions of the compressor;
- a change of the bending angle of the stator blades. If the compressor is connected to an electric motor, its speed is set by the network and is therefore constant and proportional to the network frequency, while the pressure is adjusted by one of the above mentioned methods.

If, on the other hand the compressor is moved by a steam turbine, the delivery pressure is always adjusted in the manner described above, by acting on the compressor, while the speed is normally adjusted by controlling the steam turbine intake valves.

What has been said is shown in FIG. 1: a compressor C is driven by a steam turbine TV and supplies an accumulator tank S connected with a relative user U. The delivery pressure of the compressor is controlled by partially controlling the suction valve Va placed at the suction side of the compressor or, alternatively, by changing the bending of the stator blades. The rotation speed is kept constant by adjusting the admission valve (or valves) Vi of the turbine TV. The pressure of the accumulation tank is determined by the balance between the compressed air flow consumed by the user and that produced by the compressor. Let us suppose that the power produced by the turbine at the beginning be constant and balanced with the power required by the compressor. If the user requires less compressed air, the accumulation pressure tends to increase, and therefore the compressor reacts by partially controlling its suction valve.

FIG. 2 is a typical diagram of a characteristic curve of the compressor that shows the trend of the pressure p as a function of the flow rate m. The curve F1 is the operating curve for a given speed, with the suction valve Va fully open; the point X is the rated operating point at 4 bars. If the suction valve Va is partially controlled (or the bending angle of the stator blades is varied), the working point will move onto the curve named "throttle" to such a position to balance the flow variation from m1 to m2. The suction valve can be partially controlled since when its operating point is sufficiently far from the curve which delimits the "surge" area, namely the pumping area (n n). As is well known, the pumping operation occurs in an unstable operating area that the compressor never must reach, as it can cause mechanical damages to the compressor itself. If the compressor has already reached its pumping limit but needs to further reduce its flow rate, the bypass valve is opened and the excess compressed air is released into the atmosphere.

FIG. 3 shows a typical diagram showing the trend of the power P as a function of the flow rate m. The curve F2 is the operating curve for a given speed when changing the flow rate (and therefore it is the pressure according to the curve F1 in FIG. 2 with the suction valve Va fully open); point X is the nominal operating point. Starting from this point of operation, the partial control of the suction valve Va or, alternatively, the variation in the angle of bending of the stator blades which simultaneously cause a decrease in the power absorbed by the compressor (as is noted in FIG. 3, with lines IGV and IGV respectively), then the rotation speed of the turbine-compressor assembly would tend to increase. In this situation, the turbine speed control intervenes, by closing the admission valve Vi of the turbine until the speed has been stabilized by returning to the set-point value.

In some industrial applications, steam is produced in minimal quantities or is completely absent, but at the same time the process has a considerable amount of heat at its disposal, typically in the form of hot gases at temperatures between 250 and 900° C. Sometimes steam is really available, but with temperature and pressure levels which cannot be effectively expanded in a traditional steam turbine. In these cases, excess steam or hot fumes can be exploited as a hot source for an organic Rankine cycle system. An ORC system has some advantages over traditional steam cycles, such as the higher efficiency for medium to low powers (approximately up to 5 MW), as well as an easier and cheaper handling.

As with the steam turbine, the turbine of the ORC system can be connected to an electric generator or directly coupled to an operating machine such as a compressor.

The substantial difference with respect to a conventional steam turbine is that in an ORC system the volumetric flow rates at the turbine inlet are far superior to those of a steam cycle with equivalent power, and therefore the intake valves are typically great throttle valves, which do not allow for an accurate and fast load adjustment. This is due to the fact that the enthalpy turbine jump is considerably lower than that is normally present in a steam cycle, so that the working fluid flow required to obtain a certain mechanical power is considerably greater than a steam cycle of equal power.

Therefore, a control logic as described in FIG. 1 is difficult to apply to a turbine of an ORC system if the compressed air load required by the customer is very variable. One possible solution could be to adopt a configuration already known and described in U.S. Pat. No. 3,733,095 and US 20140056687, that is to couple on the same shaft a turbine (a gas, steam, ORC, turbine), a generator/engine and a compressor: typically, one end of the generator shaft is coupled to the turbine and the other end to the working machine. The presence of the generator/engine has a dual purpose:

1) it maintains the rotation speed constant: excess power is discharged into the network, whereas if the turbine power is not sufficient it absorbs power from the network according to the compressor demand;

2) in the event of a turbine stop, it can be detached from the rotating train by means of free joints or wheels, allowing the compressor to continue to be driven by the only electric motor.

This solution has obvious advantages in terms of flexibility, but it requires a higher investment cost, due to the presence of the engine/generator.

SUMMARY OF THE INVENTION

Purpose of the present invention is to design a method of controlling a compressor which is mechanically coupled to a turbine, that is particularly advantageous even when the turbine is a portion of an organic Rankine cycle (ORC) system and does not have the above described disadvantages. According to the present invention, a method is described for controlling a compressor which is mechanically coupled to a turbine, the features of which are set forth in the attached independent claim.

Further ways of implementing said method, which are preferred and/or particularly advantageous, are described in accordance with the features disclosed in the dependent annexed claims.

A further embodiment of the present invention is an organic Rankine cycle system, comprising at least one supply pump, at least one heat exchanger, one expansion turbine mechanically coupled to a working machine, for example to a centrifugal compressor, a condenser and a control system configured to operate a method according to one of the embodiments of the present invention.

The method, according to one of its aspects, can be executed by means of a computer program, comprising a software to execute all the steps described above, in the form of a product for computer programs.

The product for computer programs may be configured as a control system for a working machine mechanically coupled to a turbine of an organic Rankine cycle system, comprising at least one controller, a data medium and a computer program stored on the data medium, so that the control system defines the embodiments of the invention in the same way it defines the method. In this case, when the control system executes the computer program, all the steps of the method are also performed, as described in the present invention.

BRIEF DESCRIPTION OF THE DRAWINGS

The invention will now be described with reference to the accompanying drawings, which illustrate some examples of non-limiting implementation, in which.

DETAILED DESCRIPTION OF THE PREFERRED EMBODIMENTS

Figure 4:
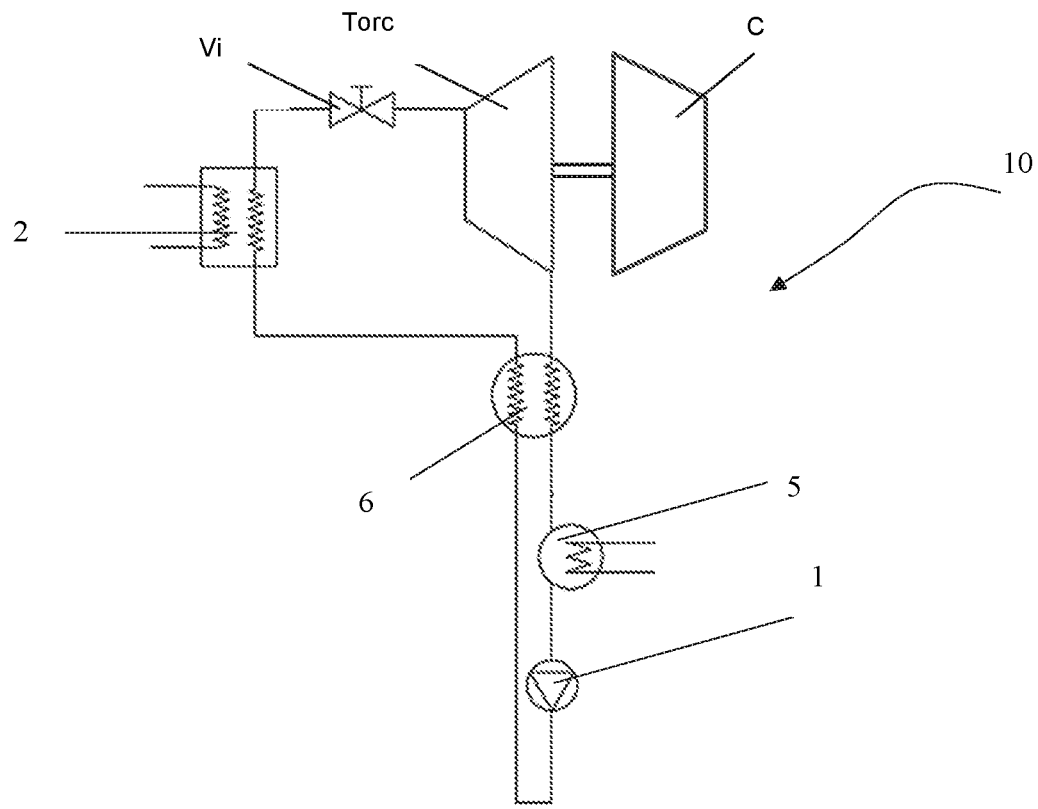
FIG. 4 schematically shows an ORC system with the turbine coupled to a working machine, which can be adjusted according to the control method of the present invention.
Figure 5:
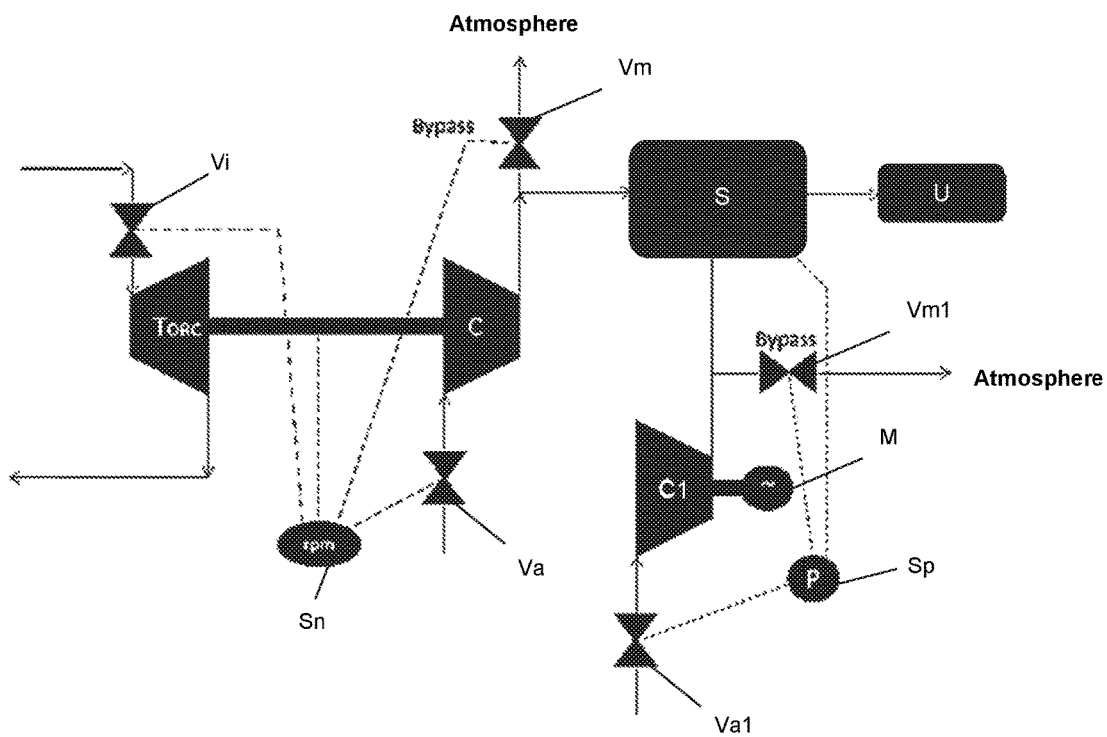
FIG. 5 shows a detail of the direct coupling scheme between a turbine and the working machine of FIG. 4, in particular a centrifugal compressor, the adjustment of which is carried out according to the control method of the present invention.

Referring to the aforementioned figures, in particular to FIG. 4, an organic Rankine cycle (ORC) 10 system is indicated as a whole. It typically includes at least one power feed pump 1 for delivering an organic working fluid, in a liquid phase, to at least one heat exchanger 2. In the heat exchanger, which can in turn include a pre-heater, an evaporator, and an over-heater, the organic fluid is heated until it is transformed into a vapor phase and is eventually overheated. At the output of the heat exchanger the steam passes through an expansion turbine TorC by producing the useful work of the organic Rankine cycle. Such useful work is a mechanical work collected at the turbine shaft which is solidly connected to an electric machine or other working machine, in this example a centrifugal compressor C. The connection can be made directly (as shown in FIGS. 4 and 5) or by interposing a revolutions reducer. The working fluid then crosses a condenser 5 which returns it into the liquid phase in order to be sent from the pump 1 again to the heat exchanger. Advantageously, in order to increase the efficiency of the cycle, a heat recovery 6 can be inserted between the turbine TorC and the condenser 5, i.e. a heat exchanger which exchanges heat between the organic vapor-phase fluid which is directed from the turbine 3 towards the condenser 5 and the liquid phase organic fluid which is pumped from pump 1 to the heat exchanger 2.

Figure 6:
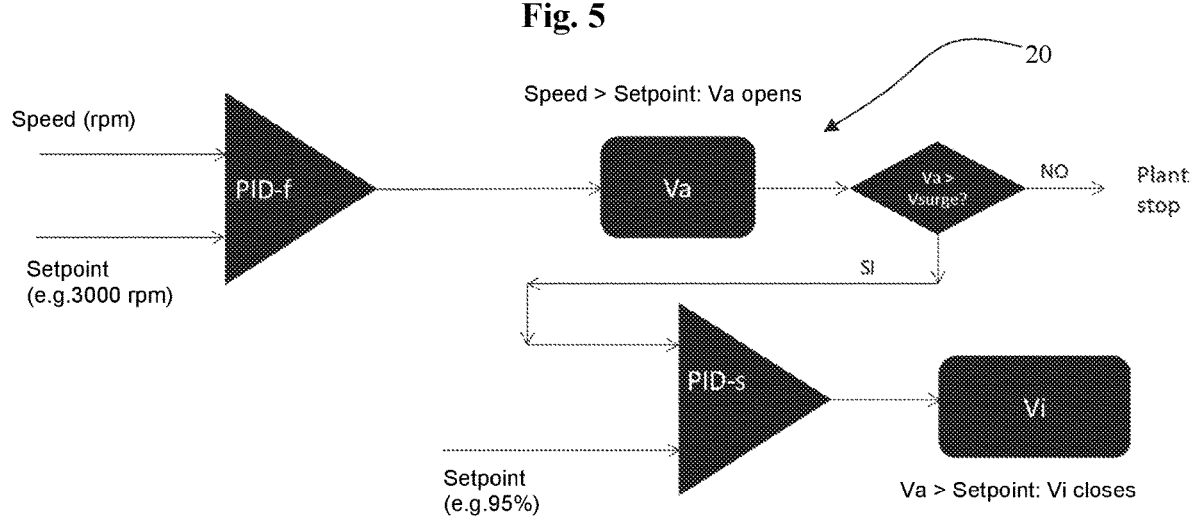
FIG. 6 is a logical scheme of the control method according to the present invention.

The direct coupling between the turbine TorC and the compressor C is managed according to the control method of the present invention with reference to FIGS. 5 and 6.

First of all, it must be considered that large plants have more than one compressor which supplies the compressed air circuit. Usually, the compressors are driven by an engine and are pressurized according to one of the ways outlined above; furthermore, at least one of these compressors is chosen in order to apply a basic load, or to contribute in a substantially constant way in terms of flow rate, while the other compressors work with a partial load.

The method described is based on this observation, that is one of the compressors which realizes the basic load can advantageously be coupled with an ORC turbine; such compressor will not participate in the pressure setting of the accumulator circuit, as this will be realized by the other compressors present.

In FIG. 5 just two compressors are represented by way of example. The compressor C is mechanically connected to the turbine TorC which makes the basic load and the second compressor C1 is connected to an electric motor M which makes the peak load and is adjusted either by acting on the suction valve Va1 or by modifying the bending angle of the stator blades, in order to stabilize the desired set-point pressure.

Even if also the compressor C were connected to an electric motor, it would always work at nominal load. In this case, however, the power delivered by the ORC turbine is not always constant, either as the heat source can undergo variations and as the performance is greatly affected by the condensation pressure, which in turn is affected by the ambient temperature (if the condensation heat is dissipated in the environment and is not used for cogeneration purposes).

Therefore, if the suction valve Va of the compressor C would always be open at 100%, the turbine TorC could not be able to deliver a sufficient power, causing a progressive reduction in speed until the machine is blocked.

Figure 1:
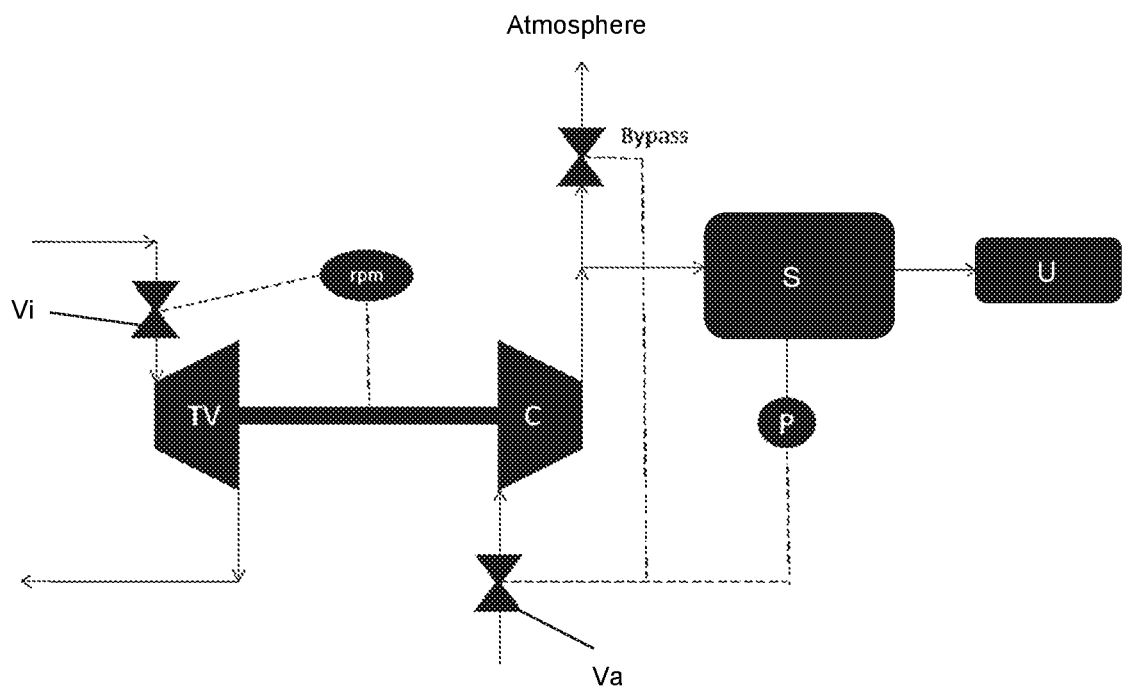
FIG. 1 shows a general direct coupling scheme between a turbine and a compressor, according to the prior art.
Figure 2:
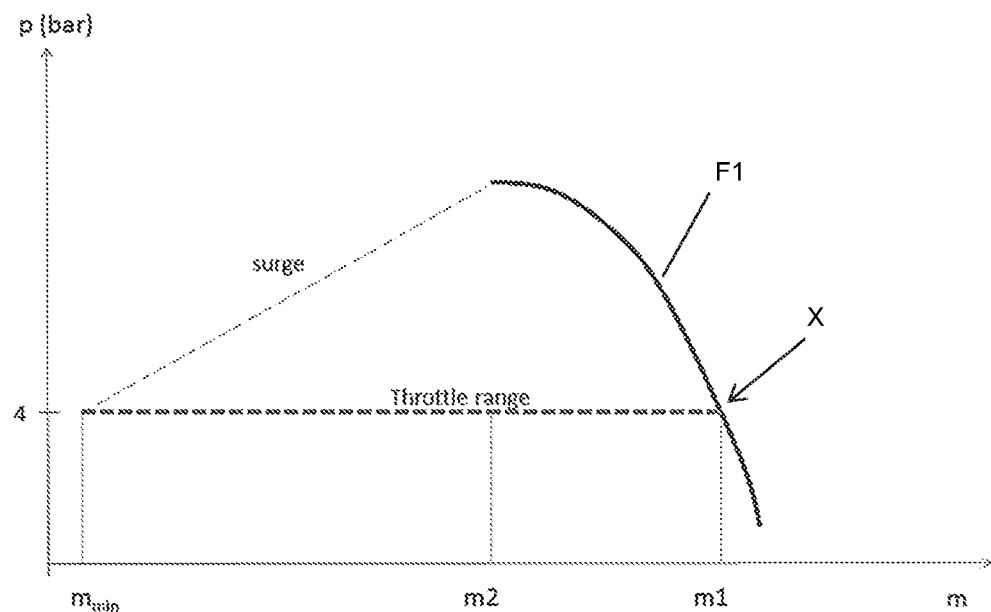
FIG. 2 shows a first characteristic curve F1 of a centrifugal compressor, in particular the trend of the pressure as a function of the flow rate with constant speed.
Figure 3:
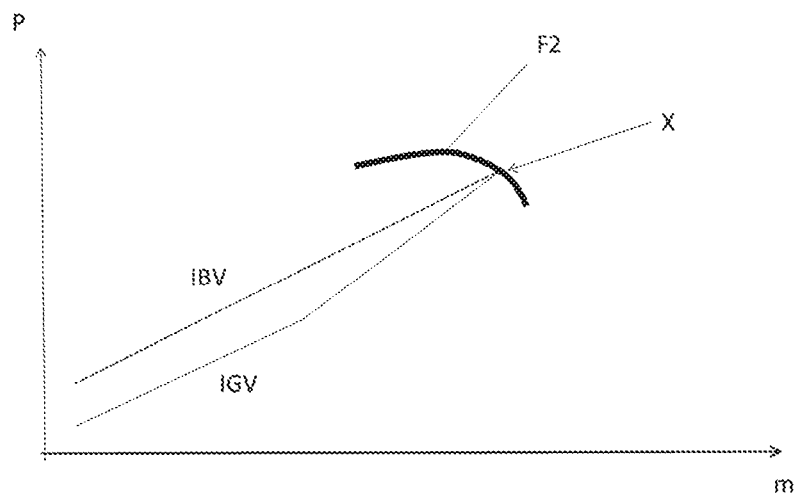
FIG. 3 shows a second characteristic curve F2 of a centrifugal compressor, in particular the trend of the power as a function of the flow rate with constant speed.

The method according to the invention provides for controlling the ORC turbine-working machine system, in order to keep constant the rotation speed of the assembly, firstly by regulating the suction valve Va of the compressor (or the bending of the stator blades), no longer as a function of the pressure, but of the rotation speed. The control system, which is internal or external to the ORC, reads the rotation speed from the turbine-compressor axis and tries to keep it constant by controlling the movement of the suction valve of the compressor. For example, referring to FIGS. 2 and 3, let us suppose that at the beginning the point of operation be the nominal one referenced with X. If the power generated by the ORC system decreases, the speed of the rotating train decreases; the control system, for example with logic of the proportional-integral-derivative (PID) type, closes the suction valve Va of the compressor C in order to reduce the power required by the compressor until the speed stabilizes at the set-point value. The operating point then moves along the "Throttle range" curve (from m1 to m2 in FIG. 2) or along the IBV curve of FIG. 3 with a reduction of the flow rate at constant pressure (as said, the pressure is maintained at a constant level thanks to other regulating compressors).

The suction valve Va of the compressor C can be closed until the pumping limit is reached; underneath this limit, the power of the recovery system is not sufficient to ensure that the compressor is working.

However, if the power generated by the turbine increases, the suction valve of the compressor is progressively opened with the same logic based on the reading of the rotation speed. If the suction valve of the compressor is still open at 100%, the rotation speed increases and the characteristic curve F1 in FIG. 2 moves toward higher flow rates. Beyond a certain speed of a few percentage points above the nominal speed, however, the turbine and the compressor cannot be driven together, and then also the suction valve Va of the turbine TorC (which in all preceding operating examples had remained open at 100%) will have to be partially controlled in order to decrease the power generated.

For this reason, subject of the present invention is a control system 20, as shown in FIG. 6. Such control system is based on two controllers with PID logic, of which the first controller PID-f will be a quick controller and will act on the suction valve Va (or on the bending angle of the stator blades) in order to control the rotation speed. The second controller PID-s is a definitely slower controller and is the one acting on the admission valve Vi of the turbine TorC (which in itself is still much slower than the small and fast compressor control valves, as mentioned above) in order to check the closure level of the suction valve Va and preventing it from closing too much. In practice, the second controller must act in order to return the position of the valve Va of the compressor within the limits permitted and comprised between the pumping limit and the full opening at 100%. The two PIDs must have very different temporal dynamics in order to prevent their effects from overlapping, so causing instability in the control. For example, let us assume that the suction valve Va at the beginning is open at 90%, and that the ORC is suddenly beginning to produce much more mechanical power. As a result, the rotation speed tends to increase. The first controller PID-f reacts by opening the suction valve and bringing the speed back to the set-point value. After passing a certain degree of opening of the suction valve (for example 95%), the turbine admission valve Vi slowly closes being controlled by the slow second controller PID-s in order to return the suction valve of the compressor to the set-point value (95% in the example), while maintaining the opening degree of the suction valve Va within the limits permitted and in any case close to its set-point value. As a matter of fact, by closing the turbine admission valve, less power is delivered and then the rotation speed tends to decrease and consequently the suction valve tends to close. Finally, the system will settle with the turbine admission valve Vi partially controlled, in such a way that the suction valve Va is open at 95%.

If, on the other hand, the suction valve Va settles with a value less than 95%, the turbine admission valve Vi will necessarily be 100% open.

The control method therefore consists of the following operations:

a) a "fast" control of the rotation speed of the turbine/compressor assembly C by a first controller PID-f, configured to act on the suction valve Va of the compressor C, b) a "slow" control of the suction valve Va of the compressor C within values ranging between the pumping limit and 100% by a second controller PID-s, configured to act on the admission valve Vi of the turbine TorC.

It is evident that this control method can be applied to any working machine which has internally a regulation system of the absorbed power, in which such machine is mechanically coupled to a turbine which preferably but not exclusively is a turbine of an ORC system. The two controllers are, preferably but not exclusively, of the type with a proportional-integral derivative logic (PID), and can also be of another type, such as proportional-integral logic controllers (PI).

In addition to the embodiments of the invention, as described above, it has to be understood that there are numerous further variants. It has also be understood that said embodiments are only exemplary and do not limit the scope of the invention, neither its applications nor its possible configurations. On the contrary, although the foregoing description makes it possible for a man skilled in the art to implement the present invention at least according to an exemplary configuration thereof, it has to be understood that many variations of the described components are conceivable without thereby escaping from the scope of the invention, as defined in the appended claims, considered literally and/or according to their legal equivalents.

The invention claimed is:

1. A control method of a centrifugal compressor (C) mechanically coupled to an expansion turbine (TorC), the centrifugal compressor (C) being provided with at least a control system (20) of the absorbed power, said control method of the rotation speed of a turbine-centrifugal compressor assembly, comprising the following steps:
   acting on the centrifugal compressor control system (20) of the absorbed power by means of a first controller (PID-f), in order to keep constant the rotational speed of the compressor mechanically coupled to the expansion turbine;
   ensuring that the centrifugal compressor (C) remains in a stable operating condition by means of an admission valve (Vi) of the expansion turbine (TorC);
   configuring said control system (20) to operate on a suction valve (Va) of the centrifugal compressor;
   maintaining by means of a second controller (PID-s):
      a suction valve (Va) opening
      or, not concurrently:
      a variation of a mounting angle of stator blades of the centrifugal compressor (C) at values between a pumping limit of the centrifugal compressor (C) and the 100%, by acting on the admission valve (Vi) of the expansion turbine (TorC) to stabilize a desired set-point pressure.

2. The control method according to claim 1, wherein said first controller (PID-f) is a controller with proportional integral-derivative logic.

3. The control method according to claim 1, wherein said second controller (PID-s) has a slower action with respect to the first controller, with proportional integral-derivative logic.

4. The control method according to claim 1, wherein said expansion turbine (TorC) is configured to be used in an organic Rankine cycle.

5. The control method according to claim 1, wherein said centrifugal compressor (C) feeds a tank (S), the pressure of the compressor is adjusted by controlling at least a second compressor (CI) driven by an electric motor (M).

6. An Organic Rankine cycle system comprising at least a feed pump (1), at least a heat exchanger (2), an expansion turbine (TorC), mechanically coupled to a centrifugal compressor (C), a condenser (5) and a control system (20) configured to operate the method according to claim 1.

7. A computer program comprising a software suitable to carry out the method according to claim 1.

8. A product for computer programs on which is stored the computer program according to claim 7.

* * * * *